United States Patent
Xiong et al.

(10) Patent No.: US 10,821,606 B2
(45) Date of Patent: Nov. 3, 2020

(54) COMPUTER-IMPLEMENTED METHOD FOR ROBOT FALL PREDICTION, AND ROBOT

(71) Applicant: UBTECH Robotics Corp, Shenzhen (CN)

(72) Inventors: Youjun Xiong, Shenzhen (CN); Haiwu Su, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 400 days.

(21) Appl. No.: 15/856,052

(22) Filed: Dec. 27, 2017

(65) Prior Publication Data

US 2019/0118380 A1    Apr. 25, 2019

(30) Foreign Application Priority Data

Oct. 20, 2017    (CN) .......................... 2017 1 0983268

(51) Int. Cl.
| | | |
|---|---|---|
| G05B 19/04 | (2006.01) | |
| G05B 19/18 | (2006.01) | |
| B25J 9/16 | (2006.01) | |
| G01M 1/30 | (2006.01) | |
| G01M 1/12 | (2006.01) | |

(52) U.S. Cl.
CPC .......... B25J 9/1674 (2013.01); B25J 9/1653 (2013.01); G01M 1/122 (2013.01); G01M 1/30 (2013.01); *G05B 2219/40342* (2013.01); *Y10S 901/46* (2013.01); *Y10S 901/49* (2013.01)

(58) Field of Classification Search
CPC ........ B25J 9/163; B25J 9/1653; B25J 9/1692; G05B 2219/40342; Y10S 901/09
See application file for complete search history.

(56) References Cited

U.S. PATENT DOCUMENTS

| | | | |
|---|---|---|---|
| 2005/0021176 A1* | 1/2005 | Takenaka ............... | B62D 57/02 700/245 |
| 2006/0097683 A1* | 5/2006 | Hosoda .................... | B25J 5/007 318/568.12 |
| 2006/0173578 A1* | 8/2006 | Takenaka ............. | B62D 57/032 700/245 |
| 2007/0013506 A1* | 1/2007 | Takenaka ............... | B25J 13/085 340/500 |

(Continued)

FOREIGN PATENT DOCUMENTS

CN    106709471 A    5/2017

*Primary Examiner* — Harry Y Oh

(57) ABSTRACT

The present disclosure is applicable to robot technology. A method for robot fall prediction, and a robot are provided. The method includes: searching a weighted value of a center of gravity of the robot corresponding to a posture of the robot, according to a preset first corresponding relationship; correcting an offset of the center of gravity of the robot based on the weighted value of the center of gravity of the robot; correcting an acceleration of the robot based on an offset direction of the center of gravity of the robot; and determining whether the robot will fall based on the corrected offset of the center of gravity, the offset direction of the center of gravity, and the corrected acceleration of the robot. The present disclosure improves the real-time performance and accuracy of the prediction for the fall of a robot through the fusion calculation of various data.

20 Claims, 15 Drawing Sheets

(56) References Cited

U.S. PATENT DOCUMENTS

| | | | |
|---|---|---|---|
| 2009/0187275 A1* | 7/2009 | Suga | B62D 57/032 |
| | | | 700/245 |
| 2011/0160908 A1* | 6/2011 | Iba | B25J 9/1679 |
| | | | 700/262 |
| 2013/0231822 A1* | 9/2013 | Gouaillier | B62D 57/032 |
| | | | 701/23 |
| 2015/0202768 A1* | 7/2015 | Moridaira | B62D 57/032 |
| | | | 700/258 |
| 2016/0107310 A1* | 4/2016 | Kanazawa | B62D 57/024 |
| | | | 700/254 |

* cited by examiner

COMPUTER-IMPLEMENTED METHOD FOR ROBOT FALL PREDICTION, AND ROBOT

CROSS REFERENCE TO RELATED APPLICATIONS

This application claims priority to Chinese Patent Application No. 201710983268.5, filed Oct. 20, 2017, which is hereby incorporated by reference herein as if set forth in its entirety.

BACKGROUND

1. Technical Field

The present disclosure generally relates to robot technology, and particularly to a computer-implemented method for robot fall prediction, and a robot.

2. Description of Related Art

A robot is a machine capable of performing works automatically, which can accept commands form humans, execute pre-programmed programs, and act on principles made based on artificial intelligence techniques, and be used to assist or replace humankinds to perform certain works such as manufacturing, construction, or dangerous works.

A robot is generally composed of an execution mechanism, a driving device, a detection device, a control system, complex machineries, and other components. In which, the detection device is used to detect the movement and operation condition of the robot in real time and feedback to the control system according to needs. After comparing with the setting information, the execution mechanism is adjusted so as to ensure that the movement of the robot conforms to the predetermined requirements. The sensors used as the detection device can be divided into two categories: one is the internal information sensor used to detect the internal conditions of each part of the robot, for example, the position, velocity, acceleration, and center-of-gravity of each of nodes (joint), and then the measured information is transmitted to the controller as a feedback signal so as to form closed-loop control; the other is the external information sensor used to obtain the information about the robot's operation object or the external environment so that the robot's operations can adapt to changes in the external environment so as to achieve a higher level of automation and even make the robot have a certain "sensation" which makes the robot intelligent, for instance, visual, acoustic and other external sensors may provide the relative information of the operation object and the operation environment, and the information may be used to form a large feedback loop, which will greatly improve the robot's operation accuracy.

At present, the ordinary robot fall prediction technologies are based on only the a gravity center offset or the acceleration value, which is incapable of predicting the fall of the robot accurately and the misjudgment rate for the prediction is high. Even multiple sensor parameters are combined, the cost of the prediction hardware will be too high, the prediction cannot be real-time and causes the prediction result invalid, which results in damage to the robot and even serious consequences such as casualties.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

Figure 1:
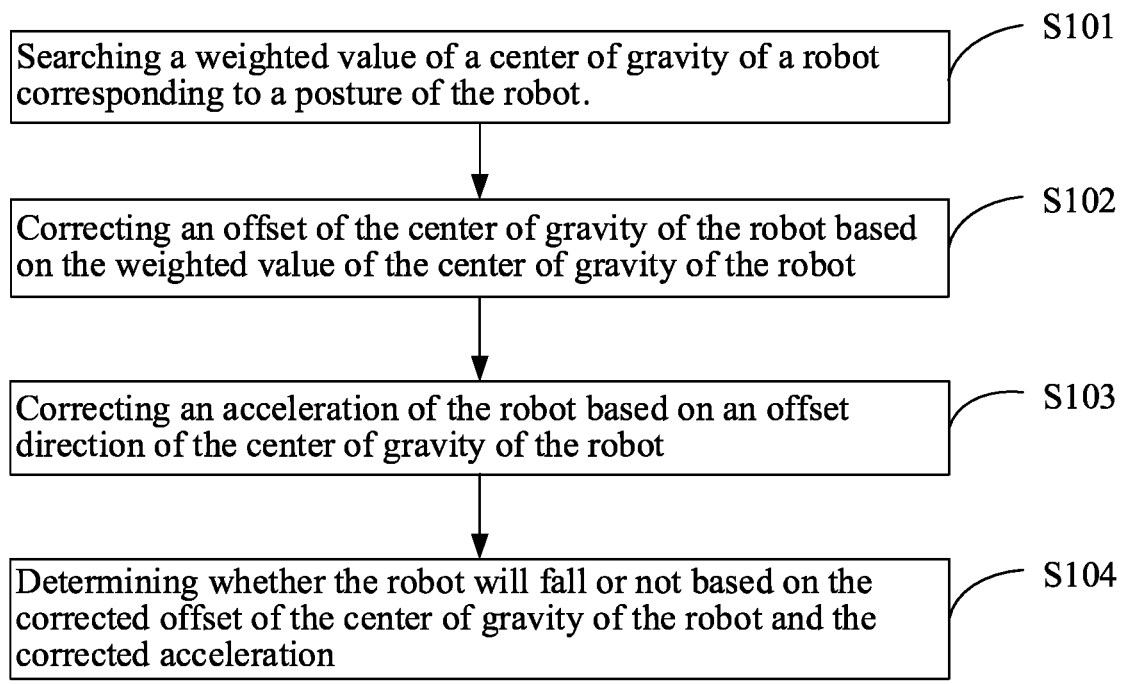
FIG. 1 is a flow chart of a robot fall prediction method according to an embodiment of the present disclosure.

In the following description, for the purpose of explanation instead of limitation, specific details such as particular system architectures, techniques, etc. are set forth so as to understand the embodiments of the present disclosure thoroughly. However, it will be apparent to those skilled in the art that the present disclosure may be implemented in other embodiments without these specific details. In other instances, detailed descriptions of well-known systems, devices, circuits, and methods are omitted so as to avoid unnecessary details to obscure the description of the present disclosure.

For the purpose of illustrating the technical scheme of the present disclosure, the following describes the specific embodiments.

It should be understood that the terms "includes (comprises)" and "including (comprising)" indicate the presence of stated features, entireties, steps, operations, elements and/or components when used in the description and the appended claims, while do not preclude the presence or addition of one or a plurality of other features, entireties, steps, operations, elements, components and/or their assemblies.

It should also be understood that the terminology used in the description of the present disclosure is merely for the purpose of describing particular embodiments and is not intended to limit the present disclosure. As used in the description and the appended claims of the present disclosure, the singular forms "one", "a" and "the" are intended to include the plural forms unless the context clearly indicates otherwise.

It should also be understood that in the description of the present disclosure, the terms "first", "second" and "third", etc., are used merely for distinguishing and can not be understood as indicating or implying the relative importance, and can not be understood that there must be a "first" in front of "second", that is, it can not be understood as having a specific quantitative meaning.

In specific implementations, the terminal device described in the embodiments of the present disclosure includes, but not limited to, a robot. In the following specific implementations, for the convenience of description, a robot will be taken as an example of the terminal device, and those skilled in the art may understand that the terminal device is not limited to a robot.

In the following discussion, the robot including a servo and a gyroscope is described. However, it should be understood that the robot may include one or a plurality of other physical user interface devices such as a physical keyboard, mouse and/or joystick.

The terminal device supports various applications such as one or more of the following: a drawing application, a presentation application, a word processing application, a website creation application, a disc burning application, a spreadsheet application, a game application, a phone application, a video conferencing application, an email application, an instant messaging application, an exercise support application, a photo management application, a digital camera application, a digital video camera application, a web browsing application, a digital music player application, and/or a digital video player application.

The various applications capable of executing on the terminal device may use at least one common physical user interface device such as a touch-sensitive surface. One or more functions of the touch-sensitive surface and the corresponding information displayed on the terminal device may be adjusted and/or changed between applications and/or within the corresponding application. As such, the common physical architecture (e.g., a touch-sensitive surface) of the terminal device may support a variety of applications having a user interface which is intuitive and transparent to the user.

FIG. 1 is a flow chart of a robot fall prediction method according to an embodiment of the present disclosure. The main body of the method in this embodiment is a robot fall prediction apparatus. The apparatus may be implemented by software and/or hardware and integrated into a robot, and is suitable for the instances in which robot fall prediction needs to be performed. In this embodiment, the method is a computer-implemented method executable for a processor. As shown in FIG. 1, the method includes the following steps:

S101: searching a weighted value of a center of gravity of a robot corresponding to a posture of the robot.

In which, corresponding to different postures of the robot, the weighted value of the center of gravity of the robot corresponding to the posture is searched according to a preset first correspondence (corresponding relationship), where the first correspondence includes a correspondence between the posture and the weighted value of the center of gravity of the robot. It should be noted that the first correspondence is empirically designed and has different first correspondences to different robots. The examples herein are merely exemplary descriptions, and the first correspondence is not specifically limited in the present disclosure.

Figure 2:
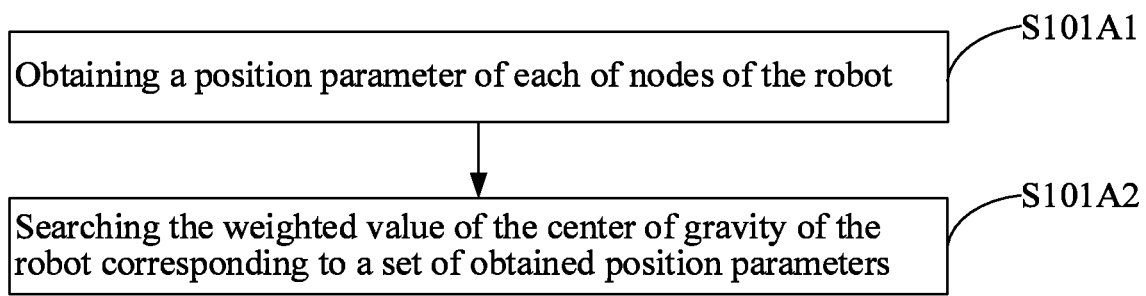
FIG. 2 is a flow chart of an embodiment of step S101 of the robot fall prediction method of FIG. 1 of the present disclosure.

Furthermore, optionally, as shown in FIG. 2, S101 includes S101A1 and S101A2.

S101A1: obtaining a position parameter of each of nodes of the robot.

In the embodiments of the present disclosure, the posture of the robot is represented by a set of the position parameters of the position sensor of the servo of each of the nodes while the robot is in a certain posture. Each of the nodes (i.e., joint) of the robot is equipped with a servo, the servo includes a position sensor, and the rotation angle of the servo, that is, the position parameter such as 45°, 60°, 90° and 100°, can be obtained by the position sensor. Different servos are different in the scope of the rotation angle, for example, 0°-180° and 0°-360°, where the rotation angles are merely exemplary descriptions.

Specifically, S101A1 includes: obtaining the position parameter of each of the nodes through the position sensor of the servo of each of the nodes of the robot to use as the posture of the robot. The posture of the robot is obtained through the position parameter of the servo which the robot originally has, hence there is unnecessary to add new hardware and the hardware cost is effectively reduced.

S101A2: searching the weighted value of the center of gravity of the robot corresponding to a set of obtained position parameters.

In which, corresponding to a set of different position parameters, the weighted value of the center of gravity of the robot corresponded by the set of the position parameters is searched according to a preset second correspondence, where the second correspondence includes a correspondence between the set of the position parameters and the weighted value of the center of gravity of the robot.

Exemplarily, if the robot includes a total of six servos, and the position parameters of the six servos are 6.5°, 15°, 45°, 60°, 95°, and 112°, respectively, the weighted value of the center of gravity of the robot corresponding to the set of the position parameters {6.5°, 15°, 45°, 60°, 95°, and 112° } is 3; if the position parameters of the six servos are 5.3°, 11°, 32°, 43°, 50°, and 80.7°, respectively, the weighted value of the center of gravity of the robot corresponding to the set of the position parameters {5.3°, 11°, 32°, 43°, 50°, and 80.7° } is 7. It should be noted that the second correspondence is empirically designed and has different second correspondences to different robots. The examples herein are merely exemplary descriptions, and the second correspondence is not specifically limited in the present disclosure.

Figure 3:
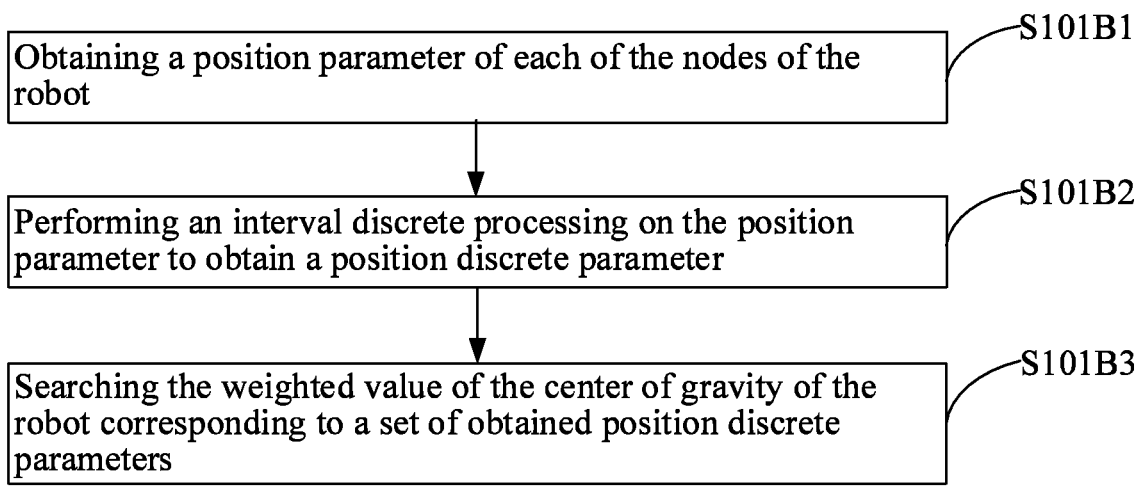
FIG. 3 is a flow chart of another embodiment of step S101 of the robot fall prediction method of FIG. 1 of the present disclosure.

Furthermore, optionally, as shown in FIG. 3, S101 includes S101B1, S101B2, and S101B3.

S101B1: obtaining a position parameter of each of the nodes of the robot.

S101B2: performing an interval discrete processing on the position parameter to obtain a position discrete parameter.

In which, in one embodiment of the present disclosure, if each of the servos adopted by the robot has a rotation angle ranging from 0°-360°, the angle range is equally divided into 36 left-opened and right-closed intervals which are (0°, 10°], (10°, 20°], (20°, 30°], . . . , (350°, 360°], respectively. The position parameter within the first interval (0°, 10°], for example, 6.5°, has the corresponding position discrete parameter of D1; the position parameter within the first interval (10°, 20°], for example, 15°, has the corresponding position discrete parameter of D2; the position parameter within the first interval (40°, 50°], for example, 45°, has the corresponding position discrete parameter of D5; the position parameter within the first interval (50°, 60°], for example, 60°, has the corresponding position discrete parameter of D6; the position parameter within the first interval (90°, 100°], for example, 95°, has the corresponding position discrete parameter of D10; the position parameter within the first interval (110°, 120°], for example, 112°, has the corresponding position discrete parameter of D12. It can be seen that the corresponding position discrete parameter can be obtained through discrete processing the position parameter interval in a similar way. It should be noted that the example herein is merely for illustration, other ways may also be taken, and it is also possible to divide the range of the rotation angle of the servo equally or non-equally into other numbers of left-opened and right-closed intervals or left-closed and right-opened intervals, where the number and the length of the intervals can be selected and set according to actual needs. Those skilled in the art can understand that, the more the total number of intervals is, the higher the accuracy is while the more the calculation and the lower the computational efficiency is. In addition, if the range of the rotation angle of the servo is 0°-180°, the same method is used. The method for discrete processing the interval is not specifically limited in the present disclosure.

S101B3: searching the weighted value of the center of gravity of the robot corresponding to a set of obtained position discrete parameters.

In which, for a set of different position discrete parameters, the weighted value of the center of gravity of the robot corresponding to the set of the position discrete parameter is searched according to a preset third correspondence relationship, where the third correspondence relationship includes a correspondence of the set of the position discrete parameter and the weighted value of the center of gravity of the robot.

Exemplarily, if the robot includes a total of six servos, and the position parameters of the six servos are 6.5°, 15°, 45°, 60°, 95°, and 112°, respectively, the position discrete parameters obtained through S101B2 are D1, D2, D5, D6, D10, and D12, respectively, the weighted value of the center of gravity of the robot corresponding to the set of the position discrete parameters {D1, D2, D5, D6, D10, and D12} is 3; if the robot includes a total of six servos, and the position parameters of the six servos are 5.3°, 11°, 32°, 43°, 50°, and 80.7°, respectively, the position discrete parameters obtained through S101B2 are D1, D2, D4, D5, D5, and D9, respectively, the weighted value of the center of gravity of the robot corresponding to the set of the position discrete parameters {D1, D2, D4, D5, D5, and D9} is 7. It should be noted that the third correspondence is empirically designed and has different third correspondences to different robots. The examples herein are merely exemplary descriptions, and the third correspondence is not specifically limited in the present disclosure.

In S101B1, S101B2 and S101B3, the position discrete parameters are obtained through the interval discrete processing first, and then the weighted value of the center of gravity of the robot corresponding to the position discrete parameters is searched. In comparison with S101A1 and S101A2 which directly searches for the weighted value of the center of gravity of the robot corresponding to the position parameters, the total data processing is reduced while ensuring the accuracy, which improves the computational efficiency.

S102: correcting an offset of the center of gravity of the robot based on the weighted value of the center of gravity of the robot.

In which, the robot includes a gyroscope. If the robot is a humanoid robot, the gyroscope may be disposed on a heart portion of the robot, and a gravity center parameter of the robot can be obtained through the gyroscope. The gravity center parameter includes an offset direction $g_{do}$ of the center of gravity and an offset $g_{vo}$ of the center of gravity. The acceleration of the robot is obtained through the gyroscope which the robot originally has, hence there is unnecessary to add new hardware and the hardware cost is effectively reduced.

Optionally, before S102, the method further includes: obtaining the gravity center parameter utilizing the gyroscope of the robot, where the gravity center parameter includes the offset direction $g_{do}$ of the center of gravity and the offset $g_{vo}$ of the center of gravity.

The offset $g_{vo}$ of the center of gravity is corrected utilizing the weighted value of the center of gravity of the robot gf to obtain the corrected offset of the center of gravity of the robot $g_{vn}=g_{vo}\times gf$.

S103, correcting an acceleration of the robot based on an offset direction of the center of gravity of the robot.

In which, as described in S102, the gravity center parameter of the robot may be obtained through the gyroscope of the robot. The gravity center parameter includes the offset direction $g_{do}$ of the center of gravity and the offset $g_{vo}$ of the center of gravity.

The robot includes an acceleration sensor, which can obtain the acceleration of the robot. The common acceleration sensors include three-axis acceleration sensors and two-axis acceleration sensors. This embodiment of the present disclosure takes a robot including a three-axis acceleration sensor as an example. Axial acceleration directions $a_{xd}$, $a_{yd}$ and $a_{zd}$ and axial acceleration values $a_{xv}$, $a_{yv}$, and $a_{zv}$ of three axes of the robot can be obtained by utilizing a three-axis acceleration sensor. Among them, $a_{xd}$, $a_{yd}$ and $a_{zd}$ are the X-axis acceleration direction, the Y-axis acceleration direction, and the Z-axis acceleration direction, and $a_{xv}$, $a_{yv}$ and $a_{zv}$ are the X-axis acceleration value, the Y-axis acceleration value, and the Z-axis acceleration value.

Figure 4:
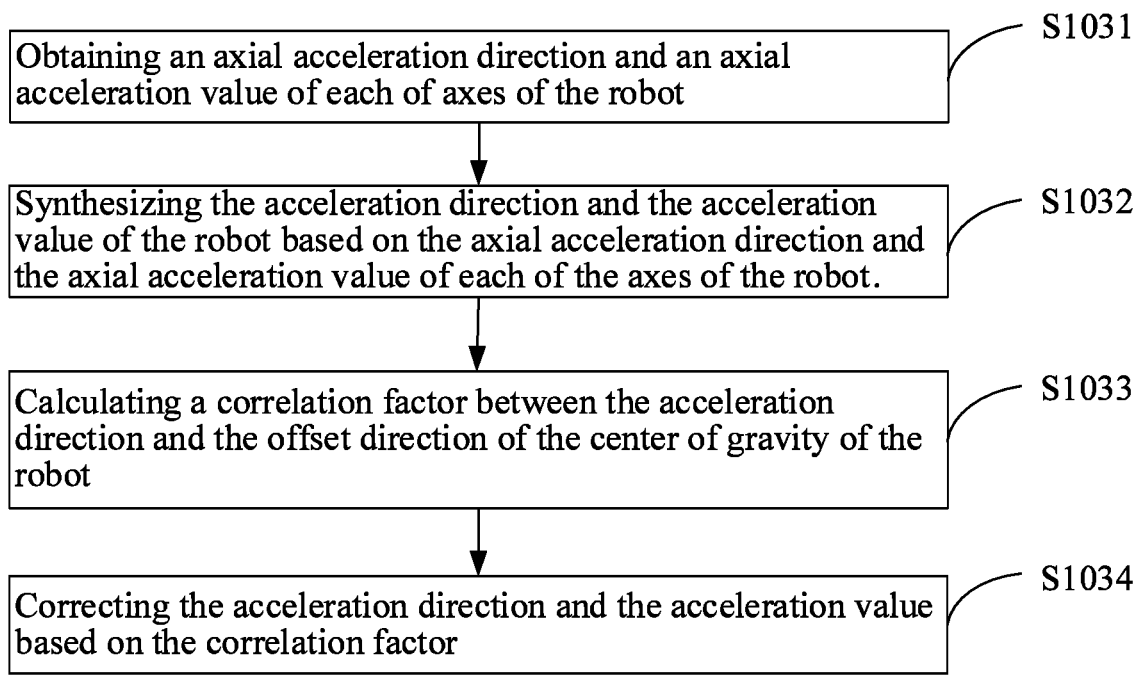
FIG. 4 is a flow chart of an embodiment of step S103 of the robot fall prediction method of FIG. 1 of the present disclosure.

Specifically, as shown in FIG. 4, S103 includes S1031-S1034.

S1031: obtaining an axial acceleration direction and an axial acceleration value of each of axes of the robot.

In which, the axial acceleration directions $a_{xd}$, $a_{yd}$, and $a_{zd}$ and the axial acceleration values $a_{xv}$, $a_{yv}$, and $a_{zv}$ of each of the axes of the robot are obtained through the acceleration sensor of the robot.

S1032: synthesizing the acceleration direction and the acceleration value of the robot based on the axial acceleration direction and the axial acceleration value of each of the axes of the robot.

In which, the acceleration direction $a_{cd}$ of the robot is synthesized based on the axial acceleration directions $a_{xd}$, $a_{yd}$, and $a_{zd}$ of each of the axes of the robot, and the acceleration value $a_{cv}$ of the robot is synthesized based on the axial acceleration values $a_{xv}$, $a_{yv}$, and $a_{zv}$ of each of the axes of the robot. The synthesis method may be a conventional technique for those skilled in the art, and is not described herein.

Through S1031-S1032, the acceleration direction and the acceleration value of the robot are obtained.

S1033: calculating a correlation factor between the acceleration direction and the offset direction of the center of gravity of the robot.

In which, the calculating the correlation factor vf between the acceleration direction acid and the offset direction $g_{do}$ of the center of gravity of the robot includes: calculating an included angle θ between the acceleration direction $a_{cd}$ and the offset direction $g_{do}$ of the center of gravity of the robot, and calculating the correlation factor vf corresponded by the included angle θ.

In one aspect, the correlation factor vf can be calculated through a functional relationship of the angle θ and the correlation factor vf.

Exemplarily, the functional relationship is: vf=|(θ−π)/(θ+π)|, where θ is in radians. The functional relationship can be a linear relationship, an exponential relationship, or a curvilinear relationship. It should be noted that the functional relationship is empirically designed and has different functional relationships for different robots. The examples are merely exemplary descriptions, and the present disclosure does not specifically limit the functional relationship.

On the other hand, the correlation factor vf can also be calculated based on a correspondence between the included angle θ and the correlation factor vf. For example, the correlation factor vf corresponded by the included angle θ may be searched according to a preset fourth correspondence, where the fourth correspondence includes a correspondence between the included angle θ and the correlation factor vf.

Exemplarily, if the included angles θ are 6.5°, 15° and 45°, respectively, the correlation factors vf corresponding to the included angles θ are 0.1, 0.3, and 0.5, respectively. It should be noted that the fourth correspondence is empirically designed and has different fourth correspondences to different robots. The examples herein are merely exemplary descriptions, and the fourth correspondence is not specifically limited in the present disclosure.

S1034: correcting the acceleration direction and the acceleration value based on the correlation factor.

In which, the correcting the acceleration direction $a_{cd}$ and the acceleration value acceleration value $a_{cv}$ based on the correlation factor vf includes: correcting the acceleration direction $a_{cd}$ based on the correlation factor vf to obtain the corrected acceleration direction $a_{cdn}=a_{cd}\times vf$; correcting the acceleration value $a_{cv}$ based on the correlation factor vf to obtain the corrected acceleration value $a_{cvn}=a_{cv}\times vf$.

S104: determining whether the robot will fall or not based on the corrected offset of the center of gravity of the robot and the corrected acceleration.

A fall probability P and a fall direction V of the robot as well as a determination is calculated based on the corrected offset of the center of gravity of the robot the corrected acceleration direction, the corrected acceleration value, and a decision tree parameter. Among them, the decision tree parameter includes a decision tree factor pf and a fall probability threshold pt, where pf and pt are the training results of the decision tree.

The decision tree utilizes a neural network training manner which sets pf to the minimum value such as 0.1 and sets pt to the maximum value such as 1 at first and moves the robot, and then corrects pf and pt gradually by comparing the decision provided by the decision tree and the actual falling situation of the robot. That is, if the robot actually falls for several times continuously while the decision provided by the decision tree is that the robot will not fall, pf is increased appropriately while pt is decreased appropriately. And then the robot is moved again to test cyclically, until the degree of the coincidence between the actual situation of the falling of the robot and the decision provided by the decision tree satisfies the requirement, where pf and pt are the training results of the decision tree.

Specifically, S104 includes: calculating the fall probability P of the robot utilizing the corrected offset $g_{vn}$ of the center of gravity of the robot, the corrected acceleration value $a_{cvn}$, and the decision tree factor pf, where $P=a_{cvn}\times g_{vn}\times pf$; calculating the fall direction V of the robot utilizing the offset direction $g_{do}$ of the center of gravity, the corrected acceleration direction $a_{cdn}$, and the decision tree factor pf, where $V=a_{cdn}\times g_{do}\times pf$. If the fall probability P is greater than or equal to the fall probability threshold pt, it means that the robot will fall; if the fall probability P is smaller than the fall probability threshold pt, it means that the robot will not fall. The fall prediction of the robot is realized in such manner.

In this embodiment, the posture of the robot is obtained in real time through the position parameter of the servo which the robot originally has, the weighted value of the center of gravity of the robot corresponding to the posture is searched accordingly, and the acceleration direction provided by the gyroscope of the robot and the (gravity center) offset are combined so as to calculate the corrected gravity center offset parameter; the acceleration of the robot is obtained through the acceleration sensor of the robot, and the corrected gravity center offset parameter is combined so as to calculate the corrected acceleration parameter; finally, the decision tree predicts the falling situation according to the corrected gravity center offset parameter and the corrected acceleration parameter, which improves the real-time performance and accuracy of robot fall prediction.

Figure 5:
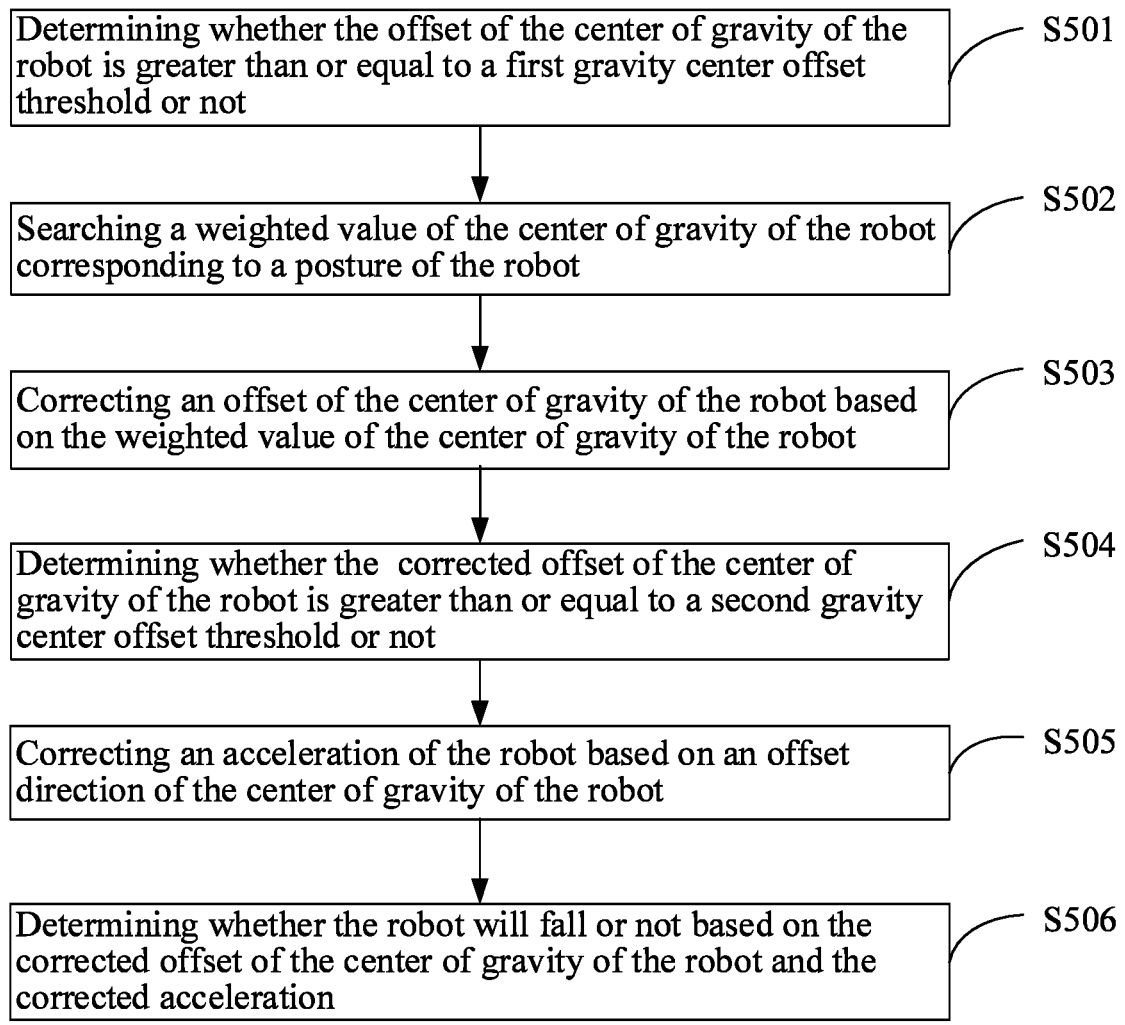
FIG. 5 is a flow chart of a robot fall prediction method according to another embodiment of the present disclosure.

FIG. 5 is a flow chart of a robot fall prediction method according to another embodiment of the present disclosure. The method in this embodiment is an improvement on the basis of the method shown in FIG. 1, and the similarities with FIG. 1 are not repeated herein. In this embodiment, the method is a computer-implemented method executable for a processor. As shown in FIG. 5, the method includes the following steps:

S501: determining whether the offset of the center of gravity of the robot is greater than or equal to a first gravity center offset threshold or not.

In which, if it is determined that the offset $g_{vo}$ of the center of gravity is greater than or equal to a first gravity center offset threshold, it indicates that there is a high possibility that the first fall prediction indicates the robot will fall, and step S502 needs to be executed.

S502: searching a weighted value of the center of gravity of the robot corresponding to a posture of the robot.

S503: correcting an offset of the center of gravity of the robot based on the weighted value of the center of gravity of the robot.

S504: determining whether the corrected offset of the center of gravity of the robot is greater than or equal to a second gravity center offset threshold or not.

In which, if it is determined that the corrected offset $g_{vn}$ of the center of gravity of the robot is greater than or equal to a second gravity center offset threshold, it indicates that there is a high possibility that the second fall prediction indicates the robot will fall, and step S505 needs to be executed.

S505: correcting an acceleration of the robot based on an offset direction of the center of gravity of the robot.

S506: determining whether the robot will fall or not based on the corrected offset of the center of gravity of the robot and the corrected acceleration.

In this embodiment, whether the offset of the center of gravity of the robot is greater than or equal to the first gravity center offset threshold or not is determined; the posture of the robot is obtained in real time through the position parameter of the servo which the robot originally has, the weighted value of the center of gravity of the robot corresponding to the posture is searched accordingly, and the acceleration direction provided by the gyroscope of the robot and the (gravity center) offset are combined so as to calculate the corrected gravity center offset parameter; whether the corrected offset of the center of gravity of the robot is greater than or equal to the second gravity center offset threshold or not is determined; the acceleration of the robot is obtained through the acceleration sensor of the robot, and the corrected gravity center offset parameter is combined so as to calculate the corrected acceleration parameter; finally, the decision tree predicts the falling situation according to the corrected gravity center offset parameter and the corrected acceleration parameter, which improves the real-time performance and accuracy of robot fall prediction through the fall prediction and the fusion calculation of various data.

Figure 6:
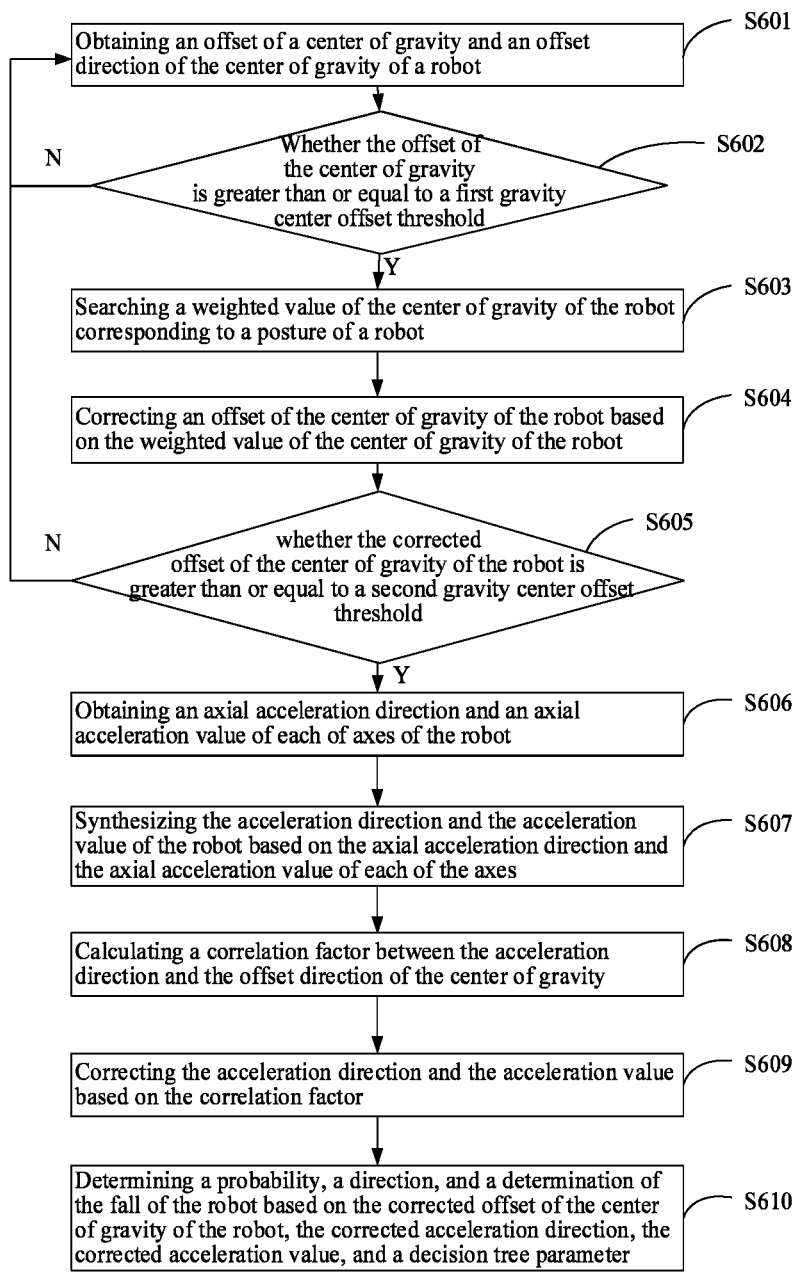
FIG. 6 is a flow chart of a robot fall prediction method according to still another embodiment of the present disclosure.

FIG. 6 is a flow chart of a robot fall prediction method according to still another embodiment of the present disclosure. The method in this embodiment is an improvement on the basis of the method shown in FIG. 1, and the similarities with FIG. 1 are not repeated herein. In this embodiment, the method is a computer-implemented method executable for a processor. As shown in FIG. 6, the method includes the following steps:

S601: obtaining an offset of a center of gravity and an offset direction of the center of gravity of a robot.

S602: determining whether the offset of the center of gravity is greater than or equal to a first gravity center offset threshold. If yes, step S603 is executed; if no, return to step S601.

In which, if it is determined that the offset of the center of gravity of the robot is greater than or equal to the first gravity center offset threshold, it indicates that there is a high possibility that the first fall prediction indicates the robot will fall, and step S603 needs to be executed; if it is determined that the offset of the center of gravity of the robot is smaller than the first gravity center offset threshold, it indicates that there is a low possibility that the first fall prediction indicates the robot will fall, and return to step S601 to re-obtain the offset of the center of gravity and the offset direction of the center of gravity of the robot, instead of executing step S603.

S603: searching a weighted value of the center of gravity of the robot corresponding to a posture of the robot.

S604: correcting an offset of the center of gravity of the robot based on the weighted value of the center of gravity of the robot.

S605: determining whether the corrected offset of the center of gravity of the robot is greater than or equal to a second gravity center offset threshold. If yes, step S606 is executed; if no, return to step S601.

In which, if it is determined that the corrected offset of the center of gravity of the robot is greater than or equal to the second gravity center offset threshold, it indicates that there is a high possibility that the second fall prediction indicates the robot will fall, and step S606 needs to be executed; if it is determined that the corrected offset of the center of gravity of the robot is smaller than the second gravity center offset threshold, it indicates that there is a low possibility that the second fall prediction indicates the robot will fall, and return to step S601 to re-obtain the offset of the center of gravity and the offset direction of the center of gravity of the robot, instead of executing step S606.

S606: obtaining an axial acceleration direction and an axial acceleration value of each of axes of the robot.

S607: synthesizing the acceleration direction and the acceleration value of the robot based on the axial acceleration direction and the axial acceleration value of each of the axes.

S608: calculating a correlation factor between the acceleration direction and the offset direction of the center of gravity.

S609: correcting the acceleration direction and the acceleration value based on the correlation factor.

S610: determining a probability, a direction, and a determination of the fall of the robot based on the corrected offset of the center of gravity of the robot, the corrected acceleration direction, the corrected acceleration value, and a decision tree parameter.

In this embodiment, whether the offset of the center of gravity of the robot is greater than or equal to the first gravity center offset threshold or not is determined; the posture of the robot is obtained in real time through the position parameter of the servo which the robot originally has, the weighted value of the center of gravity of the robot corresponding to the posture is searched accordingly, and the acceleration direction provided by the gyroscope of the robot and the (gravity center) offset are combined so as to calculate the corrected gravity center offset parameter; whether the corrected offset of the center of gravity of the robot is greater than or equal to the second gravity center offset threshold or not is determined; the acceleration of the robot is obtained through the acceleration sensor of the robot, and the corrected gravity center offset parameter is combined so as to calculate the corrected acceleration parameter; finally, the decision tree predicts the falling situation according to the corrected gravity center offset parameter and the corrected acceleration parameter, which improves the real-time performance and accuracy of robot fall prediction through the fall prediction and the fusion calculation of various data.

Figure 7:
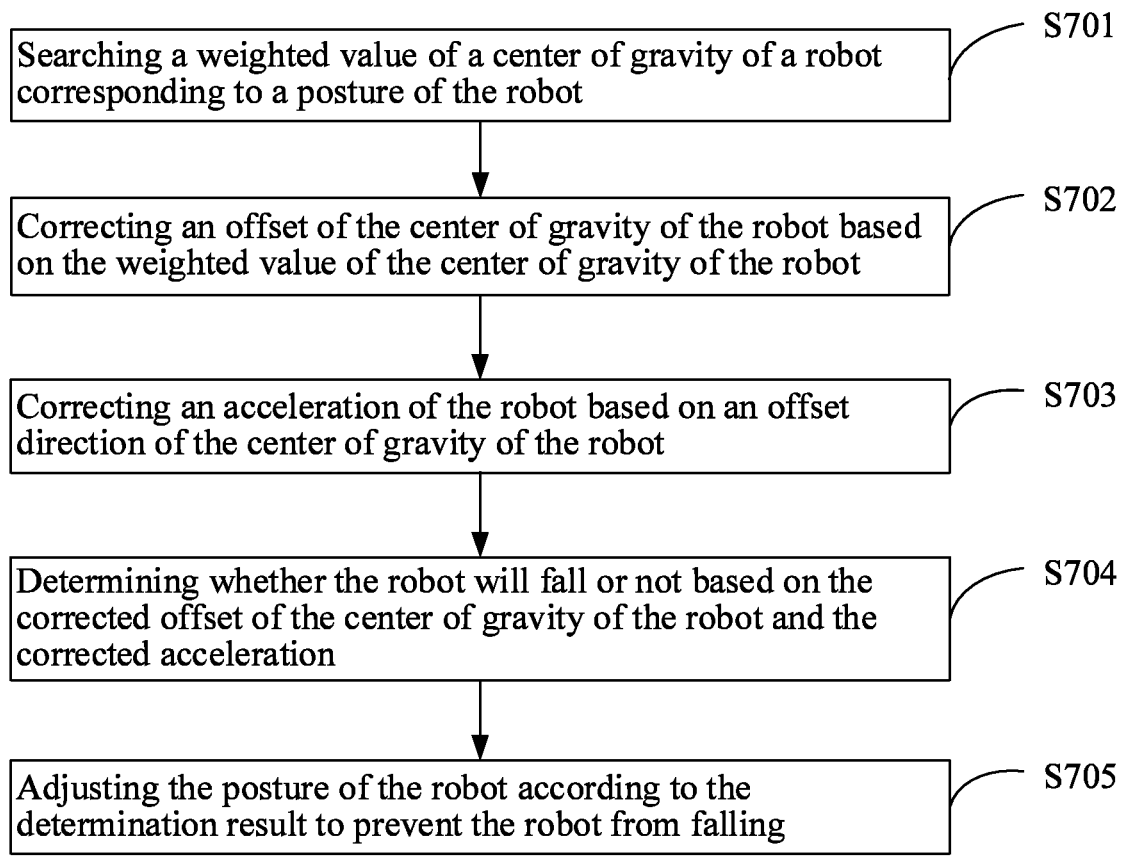
FIG. 7 is a flow chart of a robot fall prediction method according to the other embodiment of the present disclosure.

FIG. 7 is a flow chart of a robot fall prediction method according to the other embodiment of the present disclosure. The method in this embodiment is an improvement on the basis of any of the methods shown in FIGS. 1-6, except that the adjustment step is added after the last step. This embodiment is explained based on the method shown in FIG. 1, and the similarities with FIG. 1 are not repeated herein. In this embodiment, the method is a computer-implemented method executable for a processor. As shown in FIG. 7, the method includes the following steps:

S701: searching a weighted value of a center of gravity of a robot corresponding to a posture of the robot.

S702: correcting an offset of the center of gravity of the robot based on the weighted value of the center of gravity of the robot.

S703, correcting an acceleration of the robot based on an offset direction of the center of gravity of the robot.

S704: determining whether the robot will fall or not based on the corrected offset of the center of gravity of the robot and the corrected acceleration.

S705: adjusting the posture of the robot according to the determination result (of S704) to prevent the robot from falling.

In which, the fall probability P and the fall direction V of the robot are calculated through S704, and if the fall probability P is greater than or equal to the fall probability threshold pt, it means that the robot will fall; if the fall probability P is smaller than the fall probability threshold pt, it means that the robot will not fall. The fall prediction of the robot is realized in such manner.

Specifically, S705 includes: if the determination indicates that the robot is going to fall, a balance posture of the robot is calculated according to the fall probability P and the fall direction V, and the posture of the robot is adjusted according to the balance posture so as to achieve the purpose of fall prevention. Exemplarily, the balance posture of the robot is achieved by calculating the new position parameters of the servo of the robot, and the posture of the robot is adjusted through the new position parameters, thereby achieving the purpose of fall prevention.

In this embodiment, the posture of the robot is obtained in real time through the position parameter of the servo which the robot originally has, the weighted value of the center of gravity of the robot corresponding to the posture is searched accordingly, and the acceleration direction provided by the gyroscope of the robot and the (gravity center) offset are combined so as to calculate the corrected gravity center offset parameter; whether the corrected offset of the center of gravity of the robot is greater than or equal to the second gravity center offset threshold or not is determined; the acceleration of the robot is obtained through the acceleration sensor of the robot, and the corrected gravity center offset parameter is combined so as to calculate the corrected acceleration parameter; finally, the decision tree predicts the fall status according to the corrected gravity center offset parameter and the corrected acceleration parameter, and the posture of the robot is adjusted according to the determination so as to prevent the robot from falling.

Figure 8:
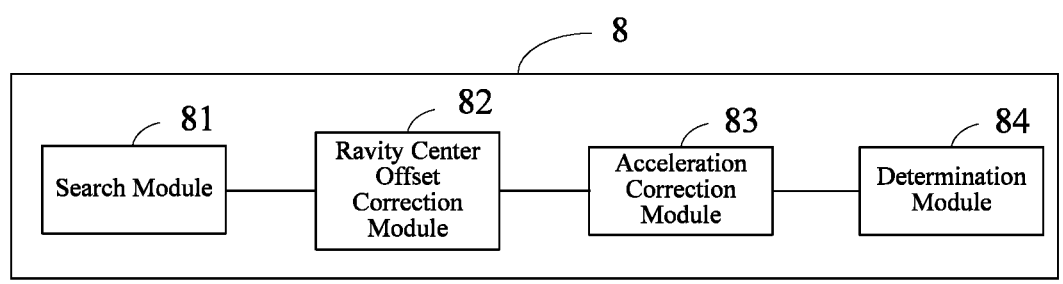
FIG. 8 is a block diagram of a robot fall prediction apparatus according to an embodiment of the present disclosure.

FIG. 8 is a block diagram of a robot fall prediction apparatus according to an embodiment of the present disclosure. For the content of the embodiment of the robot fall prediction apparatus which is not described in detail, refer to the embodiments of the robot fall prediction method shown in FIGS. 1-4. As shown in FIG. 8, a robot fall prediction apparatus 8 includes a search module 81, a gravity center offset correction module 82, an acceleration correction module 83, and a determination module 84. In this embodiment, the robot fall prediction apparatus 8 includes a processor and a memory storing instructions executable for the processor, where the instructions functions as the search module 81, the gravity center offset correction module 82, the acceleration correction module 83, and the determination module 84.

In which, the search module 81 is configured to search a weighted value of the center of gravity of a robot corresponding to a posture of the robot.

The gravity center offset correction module 82 is configured to correct an offset of the center of gravity of the robot based on the weighted value of the center of gravity of the robot.

The acceleration correction module 83 is configured to correct an acceleration of the robot based on an offset direction of the center of gravity of the robot.

The determination module 84 is configured to determine whether the robot will fall or not based on the corrected offset of the center of gravity of the robot and the corrected acceleration.

Figure 9:
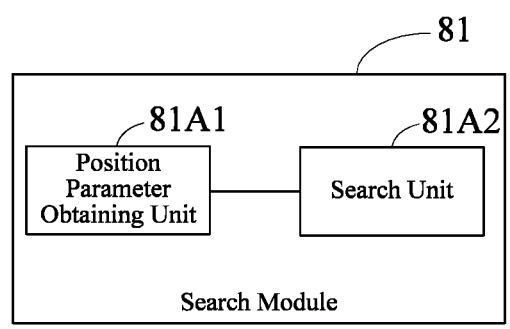
FIG. 9 is a block diagram of an embodiment of the module 81 of the robot fall prediction apparatus of FIG. 8 of the present disclosure.

Furthermore, on the one hand, as shown in FIG. 9, the search module 81 includes a position parameter obtaining unit 81A1 and a search unit 81A2.

In which, the position parameter obtaining unit 81A1 is configured to obtain a position parameter of each of the nodes of the robot.

The search unit 81A2 is configured to search the weighted value of the center of gravity of the robot corresponding to a set of the position parameter.

Figure 10:
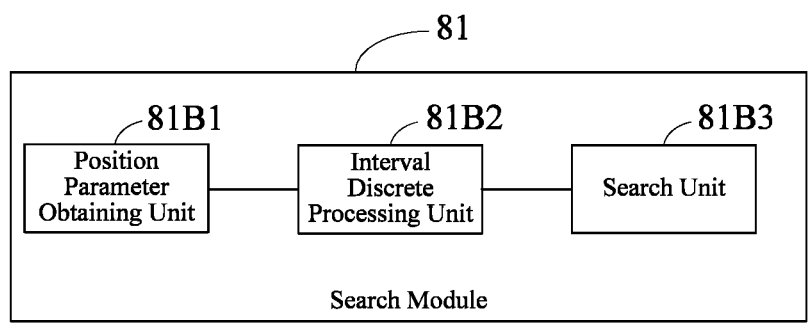
FIG. 10 is a block diagram of another embodiment of the module 81 of the robot fall prediction apparatus of FIG. 8 of the present disclosure.

On the other hand, as shown in FIG. 10, the search module 81 includes a position parameter obtaining unit 81B1, an interval discrete processing unit 81B2, and a search unit 81B3.

The position parameter obtaining unit 81B1 is configured to obtain a position parameter of each of the nodes of the robot.

The interval discrete processing unit 81B2 is configured to perform an interval discrete processing on the position parameter to obtain a position discrete parameter.

The search unit 81B3 is configured to search the weighted value of the center of gravity of the robot corresponding to a set of the position discrete parameter.

Figure 11:
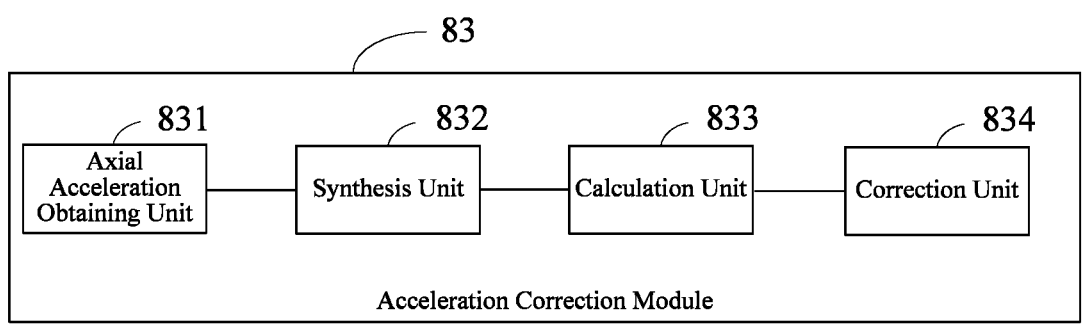
FIG. 11 is a block diagram of the module 83 of the robot fall prediction apparatus of FIG. 8 of the present disclosure.

Furthermore, as shown in FIG. 11, the acceleration correction module 83 includes: an axial acceleration obtaining unit 831, a synthesis unit 832, a calculation unit 833, and a correction unit 834.

In which, the axial acceleration obtaining unit 831 is configured to obtain an axial acceleration direction and an axial acceleration value of each of the axes of the robot.

The synthesis unit 832 is configured to synthesize the acceleration direction and the acceleration value of the robot based on the axial acceleration direction and the axial acceleration value of each of the axes of the robot.

The calculation unit 833 is configured to calculate a correlation factor between the acceleration direction and the offset direction of the center of gravity of the robot.

The correction unit 834 is configured to correct the acceleration direction and the acceleration value based on the correlation factor.

Figure 12:
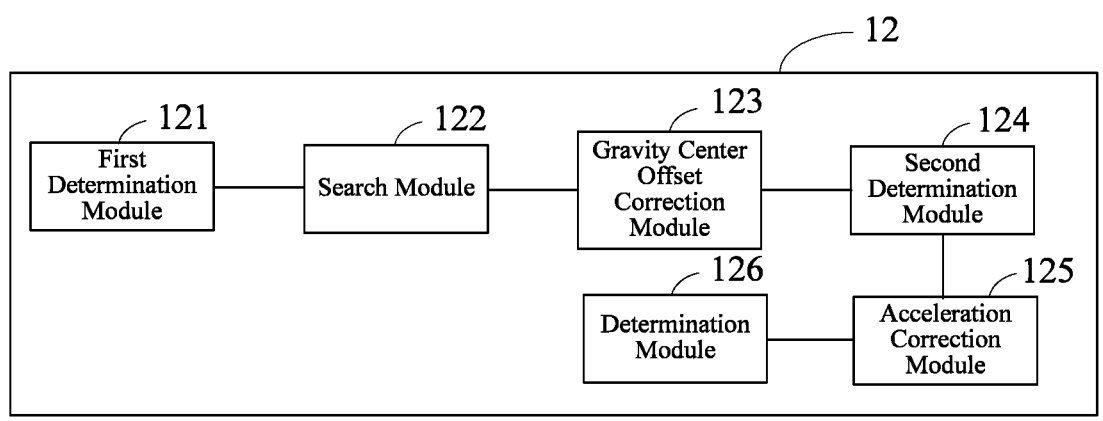
FIG. 12 is a block diagram of a robot fall prediction apparatus according to another embodiment of the present disclosure.

FIG. 12 is a block diagram of a robot fall prediction apparatus according to another embodiment of the present disclosure. For the content of the embodiment of the robot fall prediction apparatus which is not described in detail, refer to the embodiment of the robot fall prediction method shown in FIG. 5. As shown in FIG. 12, a robot fall prediction apparatus 12 includes a first determination module 121, a search module 122, a gravity center offset correction module 123, a second determination module 124, an acceleration correction module 125, and a determination module 126. In this embodiment, the robot fall prediction apparatus 12 includes a processor and a memory storing instructions executable for the processor, where the instructions functions as the first determination module 121, the search module 122, the gravity center offset correction module 123, the second determination module 124, the acceleration correction module 125, and the determination module 126.

In which, the first determining module 121 is configured to determine whether the offset of the center of gravity of the robot is greater than or equal to a first gravity center offset threshold or not.

A search module 122 is configured to search a weighted value of the center of gravity of the robot corresponding to a posture of the robot.

A gravity center offset correction module 123 configured to correct an offset of the center of gravity of the robot based on the weighted value of the center of gravity of the robot.

The second determination module 124 is configured to determine whether the corrected offset of the center of gravity of the robot is greater than or equal to a second gravity center offset threshold or not.

The acceleration correction module 125 is configured to correct an acceleration of the robot based on an offset direction of the center of gravity of the robot.

The decision module 126 is configured to determine whether the robot will fall or not based on the corrected offset of the center of gravity of the robot and the corrected acceleration.

Figure 13:
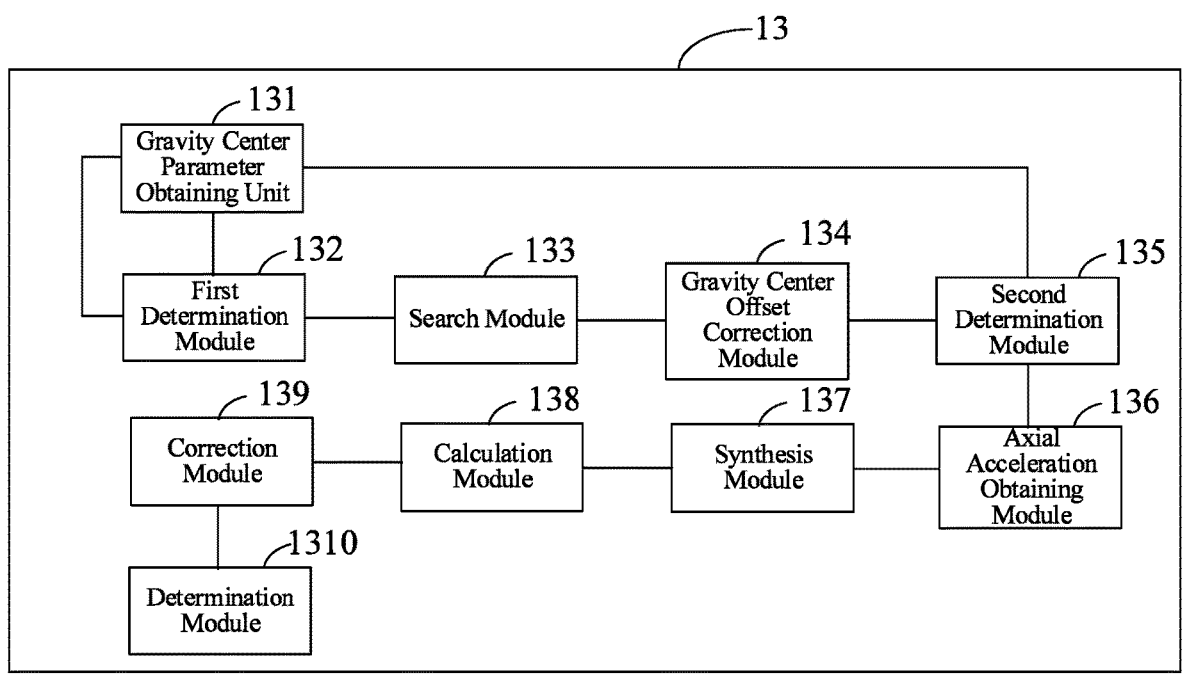
FIG. 13 is a block diagram of a robot fall prediction apparatus according to still another embodiment of the present disclosure.

FIG. 13 is a block diagram of a robot fall prediction apparatus according to still another embodiment of the present disclosure. For the content of the embodiment of the robot fall prediction apparatus which is not described in detail, refer to the embodiment of the robot fall prediction method shown in FIG. 6. As shown in FIG. 13, a robot fall prediction apparatus 13 includes a gravity center parameter obtaining unit 131, a first determination module 132, a search module 133, a gravity center offset correction module 134, a second determination module 135, an axial acceleration obtaining module 136, a synthesis module 137, a calculation module 138, a correction module 139, and a determination module 1310. In this embodiment, the robot fall prediction apparatus 13 includes a processor and a memory storing instructions executable for the processor, where the instructions functions as the gravity center parameter obtaining unit 131, the first determination module 132, the search module 133, the gravity center offset correction module 134, the second determination module 135, the axial acceleration obtaining module 136, the synthesis module 137, the calculation module 138, the correction module 139, and the determination module 1310.

In which, the gravity center parameter obtaining unit 131 is configured to obtain an offset of the center of gravity and an offset direction of the center of gravity of a robot.

The first determining module 132 is configured to determine whether the offset of the center of gravity is greater than or equal to a first gravity center offset threshold. If yes, the search module 133 is connected; if no, the gravity center parameter obtaining unit 131 is connected.

The search module 133 is configured to search a weighted value of the center of gravity of the robot corresponding to a posture of a robot if the first determining module 132 determines that the gravity center offset is greater than or equal to the first gravity center offset threshold.

The center of gravity offset correcting module 134 is configured to correct an offset of the center of gravity of the robot based on the weighted value of the center of gravity of the robot.

The second determining module 135 is configured to determine whether the corrected offset of the center of gravity of the robot is greater than or equal to a second gravity center offset threshold. If yes, the axial acceleration obtaining module 136 is connected; if no, the gravity center parameter obtaining unit 131 is connected.

The axial acceleration obtaining module 136 is configured to obtain an axial acceleration direction and an axial acceleration value of each of the axes of the robot if the second determining module 135 determines that the corrected offset of the center of gravity of the robot is greater than or equal to the second gravity center offset threshold.

The synthesis module 137 is configured to synthesize the acceleration direction and the acceleration value of the robot based on the axial acceleration direction and the axial acceleration value of each of the axes.

The calculation module 138 is configured to calculate a correlation factor between the acceleration direction and the offset direction of the center of gravity.

The correction module 139 is configured to correct the acceleration direction and the acceleration value based on the correlation factor.

The decision module 1310 is configured to determine a probability, a direction, and a determination of the fall of the robot based on the corrected offset of the center of gravity of the robot, the corrected acceleration direction, the corrected acceleration value, and a decision tree parameter.

In which, the gravity center parameter obtaining unit 131 is further configured to re-obtain the offset of the center of gravity and the offset direction of the center of gravity of the robot if the first determination module 132 determines that the gravity center offset is smaller than the first gravity center offset threshold and the second determination module 135 determines that the corrected offset of the center of gravity of the robot is smaller than the second gravity center offset threshold.

Figure 14:
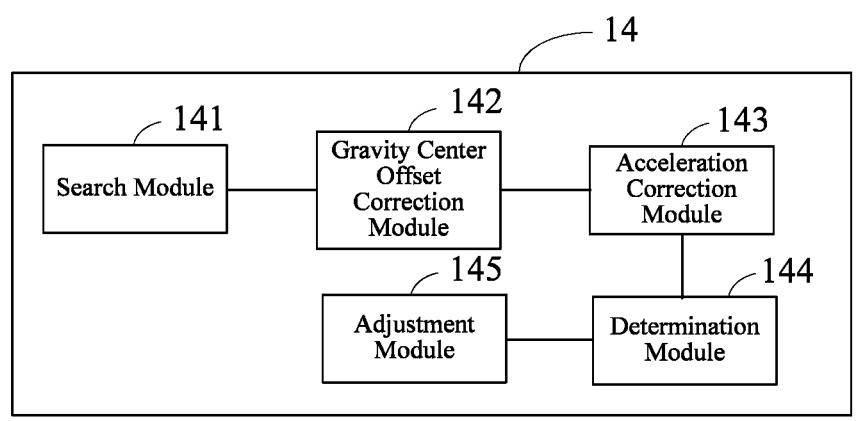
FIG. 14 is a block diagram of a robot fall prediction apparatus according to the other embodiment of the present disclosure.

FIG. 14 is a block diagram of a robot fall prediction apparatus according to the other embodiment of the present disclosure. The apparatus in this embodiment is different from the apparatuses in FIGS. 8-13 only in that an adjustment module is added in the apparatus. This embodiment is explained based on the apparatus shown in FIG. 8, and the similarities with FIG. 8 are not repeated herein. As shown in FIG. 14, a robot fall prediction apparatus 14 includes a search module 141, a gravity center offset correction module 142, an acceleration correction module 143, a determination module 144, and an adjustment module 145. In this embodiment, the robot fall prediction apparatus 14 includes a processor and a memory storing instructions executable for the processor, where the instructions functions as the search module 141, the gravity center offset correction module 142, the acceleration correction module 143, the determination module 144, and the adjustment module 145.

In which, the search module 141 is configured to search a weighted value of the center of gravity of a robot corresponding to a posture of the robot.

The gravity center offset correction module 142 is configured to correct an offset of the center of gravity of the robot based on the weighted value of the center of gravity of the robot.

The acceleration correction module 143 is configured to correct an acceleration of the robot based on an offset direction of the center of gravity of the robot.

The determination module 144 is configured to determine whether the robot will fall or not based on the corrected offset of the center of gravity of the robot and the corrected acceleration.

The adjusting module 145 is configured to adjust the posture of the robot according to the determination result (determined by the determination module 144) to prevent the robot from falling.

Figure 15:
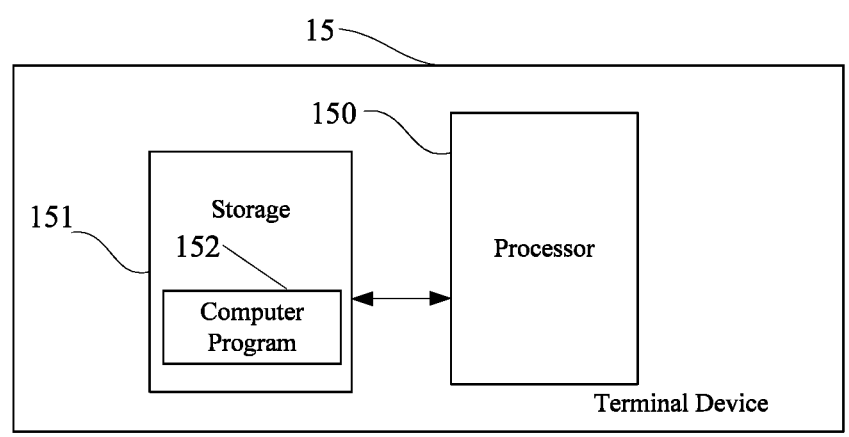
FIG. 15 is a block diagram of a terminal device according to an embodiment of the present disclosure.

FIG. 15 is a block diagram of a terminal device according to an embodiment of the present disclosure. As shown in FIG. 15, a terminal device 15 of this embodiment includes a processor 150, a storage 151, and a computer program 152 stored in the memory 151 and executable on the processor 150, for example, a robot fall prediction program. When the processor 150 executes the computer program 152, the steps in the above-mentioned embodiments of the robot fall prediction method are implemented, for example, S101-S104 shown in FIG. 1 or S701-S705 shown in FIG. 7. Alternatively, when the processor 150 executes the computer program 152, the functions of each module/unit in the above-mentioned apparatus embodiments are implemented, for example, the functions of the modules 81-84 shown in FIG. 8 or the functions of the modules 141-145 shown in FIG. 14. In this embodiment, the storage 151 is a memory.

Exemplarily, the computer program 152 may be divided into one or more modules/units, which are stored in the storage 151 and executed by the processor 150 to realize the present disclosure. The one or more modules/units may be a series of computer program instruction sections capable of performing specific functions, where the instruction sections are for describing the execution process of the computer program 152 in the terminal device 15. For example, the computer program 152 may be divided into a search module, a gravity center offset correction module, an acceleration correction module, and a determination module (may be modules in a virtual device). Specific functions of each module are as follows:

The search module is configured to search a weighted value of the center of gravity of a robot corresponding to a posture of the robot.

The gravity center offset correction module is configured to correct an offset of the center of gravity of the robot based on the weighted value of the center of gravity of the robot.

The acceleration correction module is configured to correct an acceleration of the robot based on an offset direction of the center of gravity of the robot.

The determination module is configured to determine whether the robot will fall or not based on the corrected offset of the center of gravity of the robot and the corrected acceleration.

The terminal device 15 may be a robot including a servo, a gyroscope and an acceleration sensor. The terminal device 15 may include, but is not limited to, a processor 150 and a storage 151. It can be understood by those skilled in the art that FIG. 15 is merely an example of the terminal device 15 and does not constitute a limitation on the terminal device 15, and may include more or fewer components than those shown in the figure, or combine some components or different components, for example, the terminal device 15 may further include an input/output device, a network access device, a bus, a servo, a gyroscope, and the like.

The processor 150 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 151 may be an internal storage unit of the terminal device 15, for example, a hard disk or a memory of the terminal device 15. The storage 151 may also be an external storage device of the terminal device 15 such as a plug-in hard disk, a smart media card (SMC), a secure digital (SD) card, a flash card and so on. Furthermore, the storage 151 may include both an internal storage unit and an external storage device of the terminal device 15. The storage 151 is configured to store the computer program and other programs and data required by the terminal device 15. The storage 151 may also be configured to temporarily store data which has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present application. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for robot fall prediction, comprising:

providing a robot comprising a processor, an acceleration sensor, and a gyroscope, wherein the processor is electronically coupled to the acceleration sensor and the gyroscope;

searching, by the processor, a weighted value of a center of gravity of the robot corresponding to a posture of the robot, according to a preset first corresponding relationship, wherein the preset first corresponding relationship comprises correspondence between a plurality of postures of the robot and a plurality of weighted values of the center of gravity of the robot;

obtaining, by the gyroscope, an offset direction of the center of gravity of the robot, and an offset of the center of gravity of the robot;

correcting, by the processor, the offset of the center of gravity of the robot based on the weighted value of the center of gravity of the robot;

obtaining, by the acceleration sensor, an acceleration of the robot;

correcting, by the processor, the acceleration of the robot based on the offset direction of the center of gravity of the robot; and determining, by the processor, whether the robot will fall based on the corrected offset of the center of gravity of the robot, the offset direction of the center of gravity of the robot, and the corrected acceleration of the robot.

2. The method of claim 1, wherein the robot further comprises a plurality of nodes, each of the nodes comprises a servo having a position sensor, the processor is further electronically coupled to the servo of each of the nodes, and the step of searching, by the processor, the weighted value of the center of gravity of the robot corresponding to the posture of the robot, according to the preset first corresponding relationship, comprises:

obtaining, by the processor, position parameters of the nodes of the robot used to indicate the posture of the robot, by using the position sensor; and searching, by the processor, the weighted value of the center of gravity of the robot corresponding to the obtained position parameters of the nodes of the robot, according to a preset second corresponding relationship, wherein the preset second corresponding relationship comprises correspondence between a plurality of sets of the position parameters of the nodes of the robot used to indicate the plurality of postures of the robot, and the plurality of weighted values of the center of gravity of the robot.

3. The method of claim 2, wherein the step of searching, by the processor, the weighted value of the center of gravity of the robot corresponding to the obtained position parameters of the nodes of the robot, according to the preset second corresponding relationship, comprises:

performing, by the processor, an interval discrete processing on the obtained position parameters of the nodes of the robot, to obtain position discrete parameters; and searching, by the processor, the weighted value of the center of gravity of the robot corresponding to the obtained position discrete parameters, according to a preset third corresponding relationship, wherein the preset third corresponding relationship comprises correspondence between a plurality of sets of the position discrete parameters used to indicate the plurality of postures of the robot, and the plurality of weighted values of the center of gravity of the robot.

4. The method of claim 1, wherein the step of correcting, by the processor, the offset of the center of gravity of the robot based on the weighted value of the center of gravity of the robot, comprises:

obtaining, by the processor, the corrected offset of the center of gravity of the robot by multiplying the offset of the center of gravity of the robot by the weighted value of the center of gravity of the robot.

5. The method of claim 1, wherein the acceleration of the robot comprises an acceleration direction and an acceleration value of the robot, and the step of correcting, by the processor, the acceleration of the robot based on the offset direction of the center of gravity of the robot, comprises:

calculating, by the processor, a correlation factor between the acceleration direction of the robot and the offset direction of the center of gravity of the robot; and correcting, by the processor, the acceleration direction and the acceleration value of the robot based on the correlation factor.

6. The method of claim 5, wherein the step of determining, by the processor, whether the robot will fall based on the corrected offset of the center of gravity of the robot, the offset direction of the center of gravity of the robot, and the corrected acceleration of the robot, comprises:

determining, by the processor, a probability, a direction, and a determination of the fall of the robot based on the corrected offset of the center of gravity of the robot, the offset direction of the center of gravity of the robot, the corrected acceleration direction of the robot, the corrected acceleration value of the robot, and a decision tree parameter.

7. The method of claim 6, wherein the step of determining, by the processor, the probability, the direction, and the determination of the fall of the robot based on the corrected offset of the center of gravity of the robot, the offset direction of the center of gravity of the robot, the corrected acceleration direction of the robot, the corrected acceleration value of the robot, and the decision tree parameter, comprises:

determining, by the processor, the probability of the fall of the robot based on the corrected offset of the center of gravity of the robot, the corrected acceleration value of the robot, and the decision tree parameter;

determining, by the processor, the direction of the fall of the robot based on the offset direction of the center of gravity of the robot, the corrected acceleration direction of the robot, and the decision tree parameter; and determining, by the processor, that the robot is going to fall, in response to the probability of the fall of the robot being greater than or equal to a fall probability threshold, and determining that the robot is not going to fall, in response to the probability of the fall of the robot being smaller than the fall probability threshold.

8. The method of claim 1, wherein before the step of searching, by the processor, the weighted value of the center of gravity of the robot corresponding to the posture of the robot, according to the preset first corresponding relationship, further comprises:

determining, by the processor, whether the offset of the center of gravity of the robot is greater than or equal to a first gravity center offset threshold; and in response to the offset of the center of gravity of the robot being greater than or equal to the first gravity center offset threshold, performing the step of searching, by the processor, the weighted value of the center of gravity of the robot corresponding to the posture of the robot, according to the preset first corresponding relationship.

9. The method of claim 8, wherein before the step of correcting, by the processor, the acceleration of the robot based on the offset direction of the center of gravity of the robot, further comprises:

determining, by the processor, whether the corrected offset of the center of gravity of the robot is greater than or equal to a second gravity center offset threshold; and in response to the corrected offset of the center of gravity of the robot being greater than or equal to the second gravity center offset threshold, performing the step of correcting, by the processor, the acceleration of the robot based on the offset direction of the center of gravity of the robot.

10. The method of claim 6, wherein after the step of determining, by the processor, whether the robot will fall based on the corrected offset of the center of gravity of the robot, the offset direction of the center of gravity of the robot, and the corrected acceleration of the robot, further comprises:

adjusting, by the processor, the posture of the robot according to the determination of the fall of the robot.

11. A robot, comprising:
a processor;
an acceleration sensor;
a gyroscope, wherein the processor is electronically coupled to the acceleration sensor and the gyroscope;
a memory; and
one or more computer programs stored in the memory and configured to execute a method, the method comprising steps of:
searching a weighted value of a center of gravity of the robot corresponding to a posture of the robot, according to a preset first corresponding relationship, wherein the preset first corresponding relationship comprises correspondence between a plurality of postures of the robot and a plurality of weighted values of the center of gravity of the robot;
obtaining an offset direction of the center of gravity of the robot, and an offset of the center of gravity of the robot by the gyroscope;

correcting the offset of the center of gravity of the robot based on the weighted value of the center of gravity of the robot;
obtaining, an acceleration of the robot by the acceleration sensor;
correcting the acceleration of the robot based on the offset direction of the center of gravity of the robot; and
determining whether the robot will fall based on the corrected offset of the center of gravity of the robot, the offset direction of the center of gravity of the robot, and the corrected acceleration of the robot.

12. The robot of claim 11, wherein the robot further comprises a plurality of nodes, each of the nodes comprises a servo having a position sensor, the processor is further electronically coupled to the servo of each of the nodes, and the step of searching the weighted value of the center of gravity of the robot corresponding to the posture of the robot, according to the preset first corresponding relationship, comprises:

obtaining position parameters of the nodes of the robot used to indicate the posture of the robot, by using the position sensor; and searching the weighted value of the center of gravity of the robot corresponding to the obtained position parameters of the nodes of the robot, according to a preset second corresponding relationship, wherein the preset second corresponding relationship comprises correspondence between a plurality of sets of the position parameters of the nodes of the robot used to indicate the plurality of postures of the robot, and the plurality of weighted values of the center of gravity of the robot.

13. The robot of claim 12, wherein the step of searching the weighted value of the center of gravity of the robot corresponding to the obtained position parameters of the nodes of the robot, according to the preset second corresponding relationship, comprises:

performing an interval discrete processing on the obtained position parameters of the nodes of the robot, to obtain position discrete parameters; and searching the weighted value of the center of gravity of the robot corresponding to the obtained position discrete parameters, according to a preset third corresponding relationship, wherein the preset third corresponding relationship comprises correspondence between a plurality of sets of the position discrete parameters used to indicate the plurality of postures of the robot, and the plurality of weighted values of the center of gravity of the robot.

14. The robot of claim 11, wherein the step of correcting the offset of the center of gravity of the robot based on the weighted value of the center of gravity of the robot, comprises:

obtaining the corrected offset of the center of gravity of the robot by multiplying the offset of the center of gravity of the robot by the weighted value of the center of gravity of the robot.

15. The robot of claim 11, wherein the acceleration of the robot comprises an acceleration direction and an acceleration value of the robot, and the step of correcting the acceleration of the robot based on the offset direction of the center of gravity of the robot, comprises:

calculating a correlation factor between the acceleration direction of the robot and the offset direction of the center of gravity of the robot; and correcting the acceleration direction and the acceleration value of the robot based on the correlation factor.

16. The robot of claim 15, wherein the step of determining whether the robot will fall based on the corrected offset of the center of gravity of the robot, the offset direction of the center of gravity of the robot, and the corrected acceleration of the robot, comprises:
  determining a probability, a direction, and a determination of the fall of the robot based on the corrected offset of the center of gravity of the robot, the offset direction of the center of gravity of the robot, the corrected acceleration direction of the robot, the corrected acceleration value of the robot, and a decision tree parameter.

17. The robot of claim 16, wherein the step of determining the probability, the direction, and the determination of the fall of the robot based on the corrected offset of the center of gravity of the robot, the offset direction of the center of gravity of the robot, the corrected acceleration direction of the robot, the corrected acceleration value of the robot, and the decision tree parameter, comprises:
  determining the probability of the fall of the robot based on the corrected offset of the center of gravity of the robot, the corrected acceleration value of the robot, and the decision tree parameter;
  determining the direction of the fall of the robot based on the offset direction of the center of gravity of the robot, the corrected acceleration direction of the robot, and the decision tree parameter; and
  determining that the robot is going to fall, in response to the probability of the fall of the robot being greater than or equal to a fall probability threshold, and determining that the robot is not going to fall, in response to the probability of the fall of the robot being smaller than the fall probability threshold.

18. The robot of claim 11, wherein before the step of searching the weighted value of the center of gravity of the robot corresponding to the posture of the robot, according to the preset first corresponding relationship, the method further comprises:
  determining whether the offset of the center of gravity of the robot is greater than or equal to a first gravity center offset threshold; and
  in response to the offset of the center of gravity of the robot being greater than or equal to the first gravity center offset threshold, performing the step of searching the weighted value of the center of gravity of the robot corresponding to the posture of the robot, according to the preset first corresponding relationship.

19. The robot of claim 18, wherein before the step of correcting the acceleration of the robot based on the offset direction of the center of gravity of the robot, the method further comprises:
  determining whether the corrected offset of the center of gravity of the robot is greater than or equal to a second gravity center offset threshold; and
  in response to the corrected offset of the center of gravity of the robot being greater than or equal to the second gravity center offset threshold, performing the step of correcting the acceleration of the robot based on the offset direction of the center of gravity of the robot.

20. The robot of claim 16, wherein after the step of determining whether the robot will fall based on the corrected offset of the center of gravity of the robot, the offset direction of the center of gravity of the robot, and the corrected acceleration of the robot, the method further comprises:
  adjusting the posture of the robot according to the determination of the fall of the robot.

* * * * *